US012560109B2

(12) United States Patent
Takashiba

(10) Patent No.: US 12,560,109 B2
(45) Date of Patent: Feb. 24, 2026

(54) VARIABLE VALVE TIMING SYSTEM

(71) Applicant: SUZUKI MOTOR CORPORATION, Hamamatsu (JP)

(72) Inventor: Yasuto Takashiba, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 98 days.

(21) Appl. No.: 18/163,537

(22) Filed: Feb. 2, 2023

(65) Prior Publication Data

US 2023/0250742 A1      Aug. 10, 2023

(30) Foreign Application Priority Data

Feb. 10, 2022     (JP) ................................. 2022-019254

(51) Int. Cl.
| | |
|---|---|
| *F01L 1/344* | (2006.01) |
| *B62J 41/00* | (2020.01) |
| *B62K 11/04* | (2006.01) |
| *F01L 1/02* | (2006.01) |
| *F01L 1/047* | (2006.01) |

(Continued)

(52) U.S. Cl.
CPC ............. *F01L 1/3442* (2013.01); *B62J 41/00* (2020.02); *B62K 11/04* (2013.01); *F01L 1/022* (2013.01); *F01L 1/047* (2013.01); *F01M 11/02* (2013.01); *F01L 2001/0476* (2013.01); *F01L 2001/34426* (2013.01); *F01L 2001/34433* (2013.01); *F01L 2013/10* (2013.01); *F01L 2013/105* (2013.01)

(58) Field of Classification Search
CPC ..... F01L 2001/0537; F01L 2001/34426; F01L 2001/3443; F01L 2001/34433; B62M 7/02; F02F 7/0039; F02F 7/0073; B62J 41/00; B62K 11/04; F01M 11/02

See application file for complete search history.

(56) References Cited

U.S. PATENT DOCUMENTS

| | | | | |
|---|---|---|---|---|
| 5,704,315 A | * | 1/1998 | Tsuchida | ................. F01L 1/053 |
| | | | | 123/90.6 |
| 2006/0260873 A1 | | 11/2006 | Suzuki et al. | ................. 184/6.5 |

(Continued)

FOREIGN PATENT DOCUMENTS

| | | |
|---|---|---|
| EP | 3 396 126 B1 | 4/2018 |
| JP | 5345448 B2 | 11/2013 |

OTHER PUBLICATIONS

Extended European Search Report dated Jun. 29, 2023, issued by the European Patent Office in corresponding application EP 23154966.8.

*Primary Examiner* — Wesley G Harris
(74) *Attorney, Agent, or Firm* — Stein IP, LLC

(57)      ABSTRACT

There is provided a variable valve timing system for an engine in which a cylinder head is fixed on a cylinder, and the cylinder head is suspended on a vehicle body frame, the variable valve timing system including: a variable valve device configured to change an opening and closing timing of a valve according to a hydraulic pressure; and an oil control valve. The vehicle body frame includes a main frame configured to laterally cover a rear side of the cylinder head and a down frame configured to laterally cover a front side of the cylinder head. In a side view of a vehicle, the oil control valve is detachably disposed on an outer surface of the engine below an area surrounded by the main frame, the down frame, and a lower surface of the cylinder head.

7 Claims, 11 Drawing Sheets

(51) Int. Cl.
F01M 11/02 (2006.01)
*F01L 13/00* (2006.01)

(56) References Cited

U.S. PATENT DOCUMENTS

2010/0300795 A1* 12/2010 Adachi .................. F02B 61/02
180/291
2018/0313263 A1* 11/2018 Ozeki ..................... F02B 61/02
2020/0049032 A1* 2/2020 Ozeki .................. F02F 7/0039

* cited by examiner

VARIABLE VALVE TIMING SYSTEM

CROSS-REFERENCE TO RELATED APPLICATIONS

This application is based on Japanese Patent Application No. 2022-019254 filed on Feb. 10, 2022, the contents of which are incorporated herein by way of reference.

TECHNICAL FIELD

The present invention relates to a variable valve timing system.

BACKGROUND

For an object of high output, low fuel consumption, and low exhaust gas, a variable valve timing system is employed, which controls an opening and closing timing of a valve by a variable valve device according to an operation state of an engine. As a variable valve timing system, there is a system in which an oil control valve disposed on an outer surface of a cylinder head controls a hydraulic pressure with respect to a variable valve device (see, for example, Patent Literature 1). Oil controlled by the oil control valve is supplied to the variable valve device, and the variable valve device switches between a cam for low-speed rotation and a cam for high-speed rotation to adjust an opening and closing timing of a valve.

Patent Literature 1: JP5345448B

However, in the variable valve timing system described in Patent Literature 1, a position relationship between a vehicle body frame and the oil control valve, and effects of mountability of the engine on the vehicle body frame, disposability of the oil control valve, and the like have not been sufficiently studied. Therefore, disposing the oil control valve on the outer surface of the cylinder head may have a disadvantageous effect.

The present invention has been made in view of such a point, and an object thereof is to provide a variable valve timing system suitable for a layout where an oil control valve is provided on an outer surface of an engine.

SUMMARY

There is provided a variable valve timing system for an engine in which a cylinder head is fixed on a cylinder, and the cylinder head is suspended on a vehicle body frame, the variable valve timing system including: a variable valve device configured to change an opening and closing timing of a valve according to a hydraulic pressure; and an oil control valve configured to control the hydraulic pressure with respect to the variable valve device. The vehicle body frame includes a main frame configured to laterally cover a rear side of the cylinder head and a down frame configured to laterally cover a front side of the cylinder head. In a side view of a vehicle, the oil control valve is detachably disposed on an outer surface of the engine below an area surrounded by the main frame, the down frame, and a lower surface of the cylinder head.

BRIEF DESCRIPTION OF DRAWINGS

FIG. 9A, FIG. 9B, and FIG. 9C are explanatory diagrams of the oil path in a cam housing according to the present embodiment.

FIG. 10 is a schematic view of a variable valve timing system according to the present embodiment.

DESCRIPTION OF EMBODIMENTS

A variable valve timing system according to an aspect of the present invention is mounted on an engine in which a cylinder head on a cylinder is suspended on a vehicle body frame. In the variable valve timing system, a variable valve device changes an opening and closing timing of a valve, and the oil control valve controls a hydraulic pressure with respect to the variable valve device. The vehicle body frame includes a main frame configured to laterally cover a rear side of the cylinder head and a down frame configured to laterally cover a front side of the cylinder head. In a side view of a vehicle, the oil control valve is detachably disposed on an outer surface of the engine below an area surrounded by the main frame, the down frame, and a lower surface of the cylinder head. The oil control valve is separated from the vehicle body frame on which the cylinder head is suspended, and thus the degree of freedom in a shape of the vehicle body frame is improved and an increase in a size of the vehicle is suppressed. The oil control valve is detachably disposed on the outer surface of the engine, so that mountability of the engine on the vehicle body frame and disposability of the oil control valve are improved. Since the oil control valve is brought close to the center of gravity of the engine, transmission of vibration to the oil control valve is reduced and durability of the oil control valve is improved.

EMBODIMENT

Figure 1:
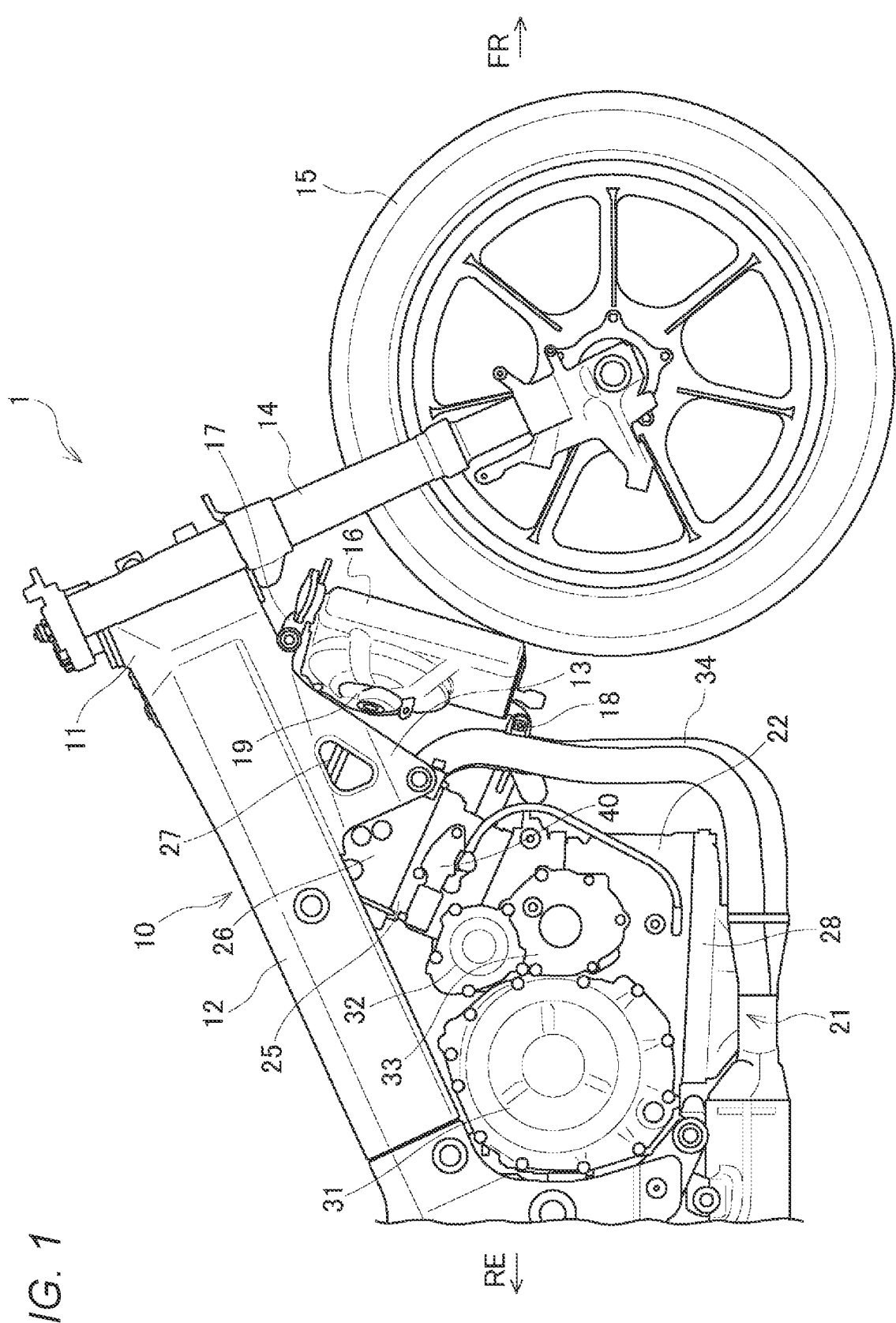
FIG. 1 is a right side view of a vehicle front portion according to the present embodiment.

Hereinafter, the present embodiment will be described in detail with reference to the accompanying drawings. FIG. 1 is a right side view of a vehicle front portion according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 21 and an electrical system that are mounted on a twin spar-type vehicle body frame 10. The vehicle body frame 10 includes a pair of main frames 12 that are branched off from a head pipe 11 to the left and right and extend rearward, and a pair of down frames 13 that extend downward from front portions of the pair of main frames 12. The pair of main frames 12 are curved so as to pass over the engine 21 and wrap around to the rear of the engine 21. An upper side and a rear side of the engine 21 are suspended by the pair of main frames 12, and a front side of the engine 21 is suspended by the pair of down frames 13.

A front fork 14 is steerably supported by the head pipe 11 via a steering shaft (not shown). A front wheel 15 is rotatably supported at a lower portion of the front fork 14. A radiator (heat exchanger) 16 that dissipates heat from cooling water of the engine 21 is provided in front of the engine 21. An upper portion of the radiator 16 is supported by the main frames via an upper bracket 17, and a lower portion of the radiator 16 is supported by the engine 21 via a lower bracket 18. A cooling fan 19 that takes in hot air from the radiator 16 when the vehicle is stopped is attached to a rear surface of the radiator 16.

The engine 21 is a parallel 4-cylinder engine in which four cylinders are arranged in left and right directions, and includes a crankcase 22 accommodating a crankshaft (not shown). A cylinder assembly in which a cylinder 25, a cylinder head 26, and a cylinder head cover 27 are laminated is attached to an upper portion of the crankcase 22. An oil pan 28 in which oil for lubrication and cooling is stored is attached to a lower portion of the crankcase 22. Engine covers such as a clutch cover 31 and starter gear covers 32 and 33 are attached to a left side surface of the crankcase 22. A plurality of exhaust pipes 34 extend downward from a front surface of the engine 21.

The engine 21 is mounted with a hydraulically controlled variable valve timing system that controls an opening and closing timing of an intake valve (not shown). A variable valve device 60 (see FIG. 9A and FIG. 9B) is accommodated inside the cylinder head 26 and the cylinder head cover 27, and an oil control valve 40 is disposed on an outer surface of the cylinder 25. The variable valve device 60 and the oil control valve 40 are connected through various oil paths in the engine 21. The oil control valve 40 controls a hydraulic pressure with respect to the variable valve device 60, so that the opening and closing timing of the intake valve is changed according to the hydraulic pressure with respect to the variable valve device 60.

Since such an engine 21 is suspended on the vehicle body frame 10, the oil control valve 40 is disposed so as to avoid interference with the vehicle body frame 10. If the oil control valve 40 protrudes greatly outward in a vehicle width direction, the vehicle body frame 10 protrudes outward in the vehicle width direction, resulting in the increase in the size of the vehicle. Therefore, the degree of freedom in a shape of the vehicle body frame 10 is restricted, and mountability of the engine 21 on the vehicle body frame 10 is deteriorated. If the oil control valve 40 is too far from the center of gravity of the engine 21, vibration of the oil control valve increases and durability of the oil control valve 40 decreases.

Therefore, in the variable valve timing system according to the present embodiment, the oil control valve 40 is disposed on the outer surface of the cylinder 25 sufficiently away from the vehicle body frame 10 and close to the center of gravity of the engine 21. Since the oil control valve 40 is detachable, the oil control valve 40 can be disposed on the outer surface of the cylinder 25 after the engine 21 is mounted on the vehicle body frame 10. Accordingly, the variable valve timing system suitable for a layout where the oil control valve 40 is disposed on an outer surface of the engine 21 is employed in the engine 21.

Figure 2:
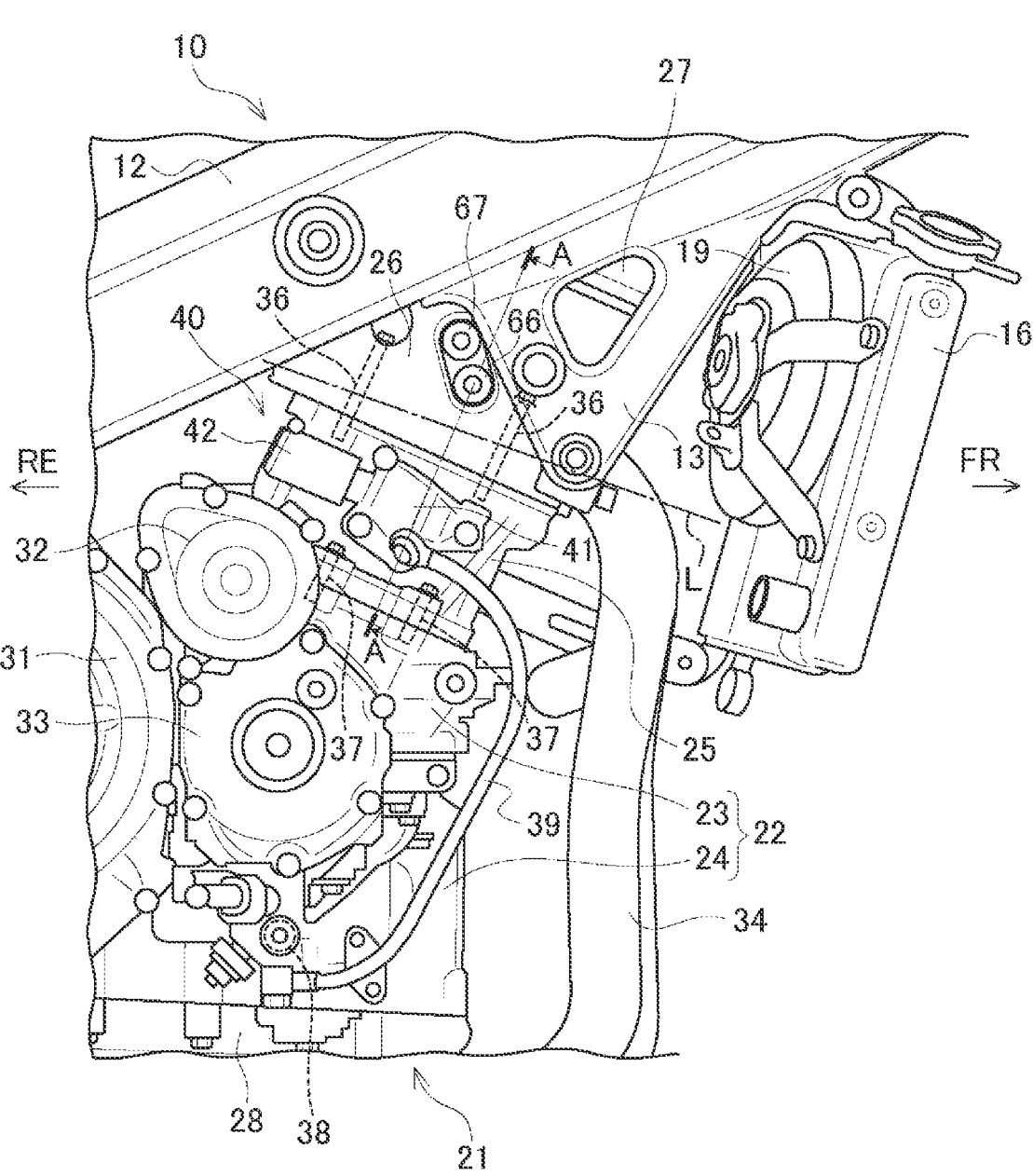
FIG. 2 is a right side view of the periphery of an engine according to the present embodiment.
Figure 3:
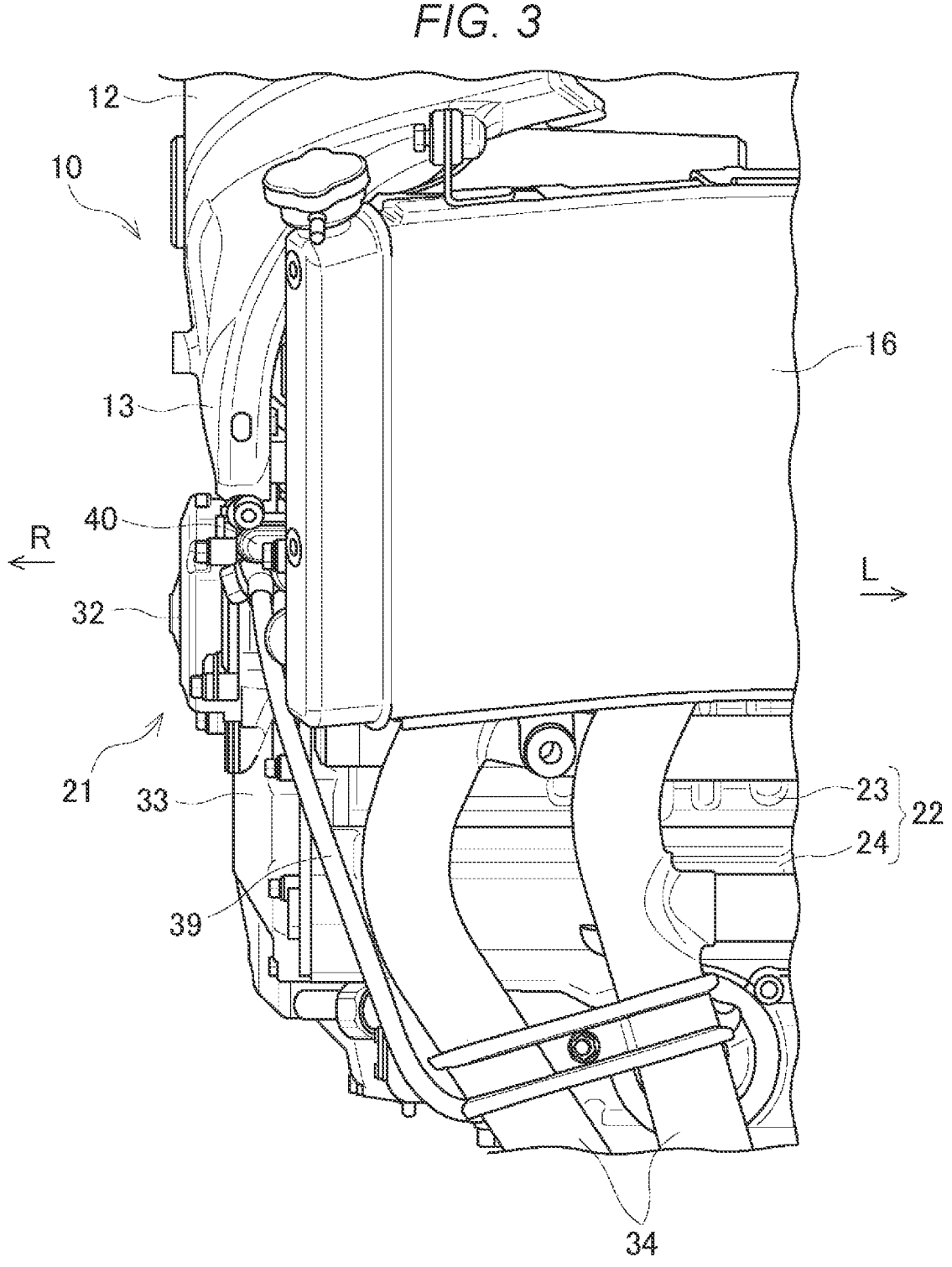
FIG. 3 is a front view of the periphery of the engine according to the present embodiment.

The layout of the oil control valve will be described with reference to FIG. 2 and FIG. 3. FIG. 2 is a right side view of the periphery of the engine according to the present embodiment. FIG. 3 is a front view of the periphery of the engine according to the present embodiment.

As shown in FIG. 2, the crankcase 22 of the engine 21 has a vertically divided structure including an upper case 23 and a lower case 24. Various shafts such as a crankshaft are supported by a mating surface between the upper case 23 and the lower case 24. The oil pan 28 is fixed to a lower surface of the lower case 24 and the cylinder 25 is fixed to an upper surface of the upper case 23. The cylinder head 26 is fixed to an upper surface of the cylinder 25, and the cylinder head cover 27 is fixed to an upper surface of the cylinder head 26. The cylinder head 26 and the crankcase 22 are suspended on the vehicle body frame 10.

A front portion of the vehicle body frame 10 branches into the main frames 12 and the down frames 13. The main frame 12 obliquely crosses a side of the cylinder head 26 from the upper surface to a rear surface, and the down frame 13 is formed in a substantially triangular shape in a side view such that a front-to-rear width narrows downward. The main frame 12 laterally covers a rear side of the cylinder head 26, and the down frame 13 laterally covers a front side of the cylinder head 26. The rear side of the cylinder head 26 is suspended on a middle portion of the main frame 12 in an extension direction, and the front side of the cylinder head 26 is suspended on a lower head portion of the down frame 13.

A triangular area (area) surrounded by a lower edge of the main frame 12, a rear edge of the down frame 13, and a lower surface of the cylinder head 26 is formed on a side surface of the cylinder head 26 in a side view of the vehicle. Although the triangular area of the cylinder head 26 is exposed to the side from between the main frame 12 and the down frame 13, the triangular area is not wide enough for the oil control valve 40. Therefore, the oil control valve is disposed on a side surface (outer surface) of the cylinder 25 below the triangular area of the cylinder head 26. The side surface of the cylinder 25 is formed by an outer wall of a cam chain chamber 58 (see FIG. 6).

A pair of plug caps 66 and 67 that close insertion openings for a pair of oil pipes 64 and 65 (see FIG. 6) which will be described later are disposed in the triangular area of the cylinder head 26. Since the plug caps 66 and 67 avoid the vehicle body frame 10 in the side view of the vehicle, the oil pipes 64 and 65 can be attached and detached through the plug caps 66 and 67 even when the engine 21 is suspended on the vehicle body frame 10, and maintainability is improved. Since the plug caps 66 and 67 are disposed along the rear edge of the down frame 13, there is no need to modify a shape of the down frame 13. In this case, the plug cap 67 at the rear of the vehicle is positioned higher than the plug cap 66 at the front of the vehicle, and the plug caps 66 and 67 are partially overlapped with each other in an up-down direction, so that a disposing area of the plug caps 66 and 67 is narrowed.

The oil control valve 40 is formed in a substantially cylindrical shape by a valve housing 41 in which a valve spool (not shown) is accommodated and a solenoid 42 that advances and retracts the valve spool. The oil path in the oil control valve 40 is switched by advancing and retracting the valve spool by the solenoid 42. The oil control valve 40 is tilted such that an axial direction of the oil control valve 40 is parallel to a mating surface between the cylinder head 26 and the cylinder 25. The solenoid 42 is provided on a rear side of the valve housing 41 and positioned above the valve housing 41.

A contamination such as metal powder may occur inside the valve housing 41, but it is difficult for the contamination to enter the solenoid 42 from the valve housing 41. That is, since the oil control valve 40 is tilted such that the solenoid 42 is located higher than the valve housing 41, the contamination is suppressed from being transferred from the valve housing 41 to the solenoid 42 by the oil. Since the contamination does not accumulate on a solenoid 42 side, damage to the oil control valve 40 due to the contamination is suppressed. Details of the oil control valve 40 will be described later.

Since the oil control valve 40 is disposed on the outer surface of the cylinder 25, the oil control valve 40 does not interfere with the vehicle body frame 10 on which the cylinder head 26 is suspended. Therefore, the vehicle body frame 10 does not protrude outward in the vehicle width direction, and an increase in a size of the straddle-type vehicle 1 is suppressed. Since the center of gravity of the engine 21 is located in the crankcase 22, the oil control valve is brought close to the center of gravity of the engine 21. Therefore, transmission of vibration from the crankcase 22 to the oil control valve 40 is reduced, and the durability of the oil control valve 40 is improved.

In the side view of the vehicle, the cylinder head 26 and the cylinder 25 are fixed by two bolts 36 on both sides of a cylinder axis, and the cylinder 25 and the crankcase 22 are fixed by two bolts 37 on the both sides of the cylinder axis. The oil control valve 40 is disposed so as not to overlap with these four bolts 36 and 37, and the oil control valve 40 is suppressed from protruding outward in the vehicle width direction. In this case, an interval between the two bolts 36 on an upper side is wider than an interval between the two bolts 37 on a lower side, and the oil control valve 40 is positioned close to the cylinder head 26.

The starter gear covers 32 and 33 that laterally cover starter gears (not shown) are provided below the oil control valve 40. The clutch cover 31 that laterally covers a clutch (not shown) is provided behind the starter gear covers 32 and 33. An upper portion of the starter gear cover 32 protrudes toward the cylinder 25, but interference between the starter gear cover and the solenoid 42 is suppressed. The starter gear covers 32 and 33 and the clutch cover are formed as separate engine covers, but the starter gear covers 32 and 33 and the clutch cover 31 may be formed as one engine cover.

As shown in FIGS. 2 and 3, the starter gear covers 32 and 33 and the clutch cover 31 bulge outward from the side surface of the cylinder 25 in the vehicle width direction. In a front view of the vehicle, the oil control valve 40 is positioned inside the starter gear covers 32 and 33, the clutch cover 31, and the down frames 13 in the vehicle width direction. The oil control valve 40 is positioned between the starter gear covers 32 and 33 and the down frames 13. The oil control valve 40 is protected by the starter gear covers 32 and 33, the clutch cover 31, and the down frames 13 when the vehicle overturns.

A main gallery 38 of the oil is formed in the crankcase 22, and the main gallery 38 and the oil control valve 40 are connected by an external pipe 39. Accordingly, the oil is directly supplied to the oil control valve 40 from the main gallery 38 with high hydraulic pressure through the external pipe 39. The oil is supplied from the main gallery 38 to the oil control valve 40 without passing through the oil path in the crankcase 22, so that pressure loss in the oil path is reduced, and the oil with high hydraulic pressure can be supplied to the oil control valve 40.

The external pipe 39 extends forward of the vehicle from the main gallery 38, wraps around the crankcase 22 from below, and extends upward. The external pipe 39 is bent toward the rear of the vehicle below the down frame 13 and connected to the valve housing 41 of the oil control valve 40. In the front view of the vehicle, the external pipe 39 passes through inner sides of the starter gear covers 32 and 33, the clutch cover 31, and the down frames 13 in the vehicle width direction, and is connected to the oil control valve 40 below the down frames 13. The external pipe 39 is protected by the starter gear covers 32 and 33, the clutch cover 31, and the down frames 13 when the vehicle overturns.

The radiator 16 having a rectangular shape in the front view is provided in front of the cylinder head 26. The radiator 16 is tilted such that the upper portion is located forward of the lower portion. The radiator 16 is a round radiator curved into an arch shape in a top view, and the cooling fan 19 is attached to the rear surface of the radiator 16 on an oil control valve side (right side) in the vehicle width direction. In the front view of the vehicle, the oil control valve 40 is disposed outside the radiator 16 in the vehicle width direction and below the down frame 13, and it is difficult for the radiator 16 and the down frames 13 to block running wind in front of the oil control valve 40.

Since the oil control valve 40 is a solenoid valve, the oil control valve 40 is likely to generate heat when the solenoid 42 is energized. Therefore, the oil control valve 40 is cooled by the running wind, so that deterioration of operability of the variable valve device 60 due to temperature rise of the oil control valve 40 and the oil is suppressed. As described above, the solenoid 42 is positioned at the rear side of the valve housing 41, and the solenoid 42 is separated from the radiator 16. The heat from the radiator 16 is less likely to be transmitted to the solenoid 42, and temperature rise of the solenoid 42 is suppressed.

In the side view of the vehicle, a lower end of the down frame 13 is positioned on an extension line L extending from a lower end of the cooling fan 19 in a blowing direction, and the oil control valve 40 is positioned below the extension line L. Exhaust air from the radiator is less likely to hit the oil control valve 40, and the deterioration of the operability of the variable valve device 60 due to the temperature rise of the oil control valve 40 and the oil is suppressed. In the front view of the vehicle, the solenoid 42 of the oil control valve 40 is covered by the down frames 13, and the exhaust air from the radiator 16 is blocked by the down frames 13 to suppress the temperature rise of the solenoid 42.

Figure 4A:
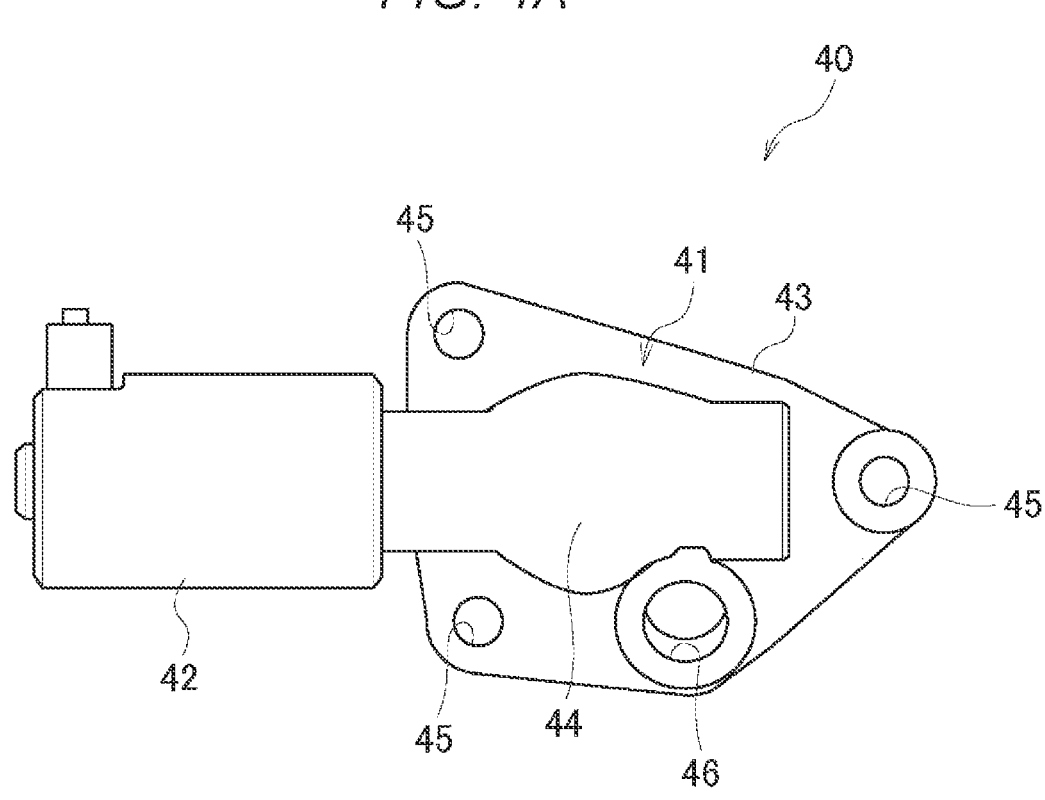
FIG. 4A and FIG. 4B are front and rear views of an oil control valve according to the present embodiment.
Figure 4B:
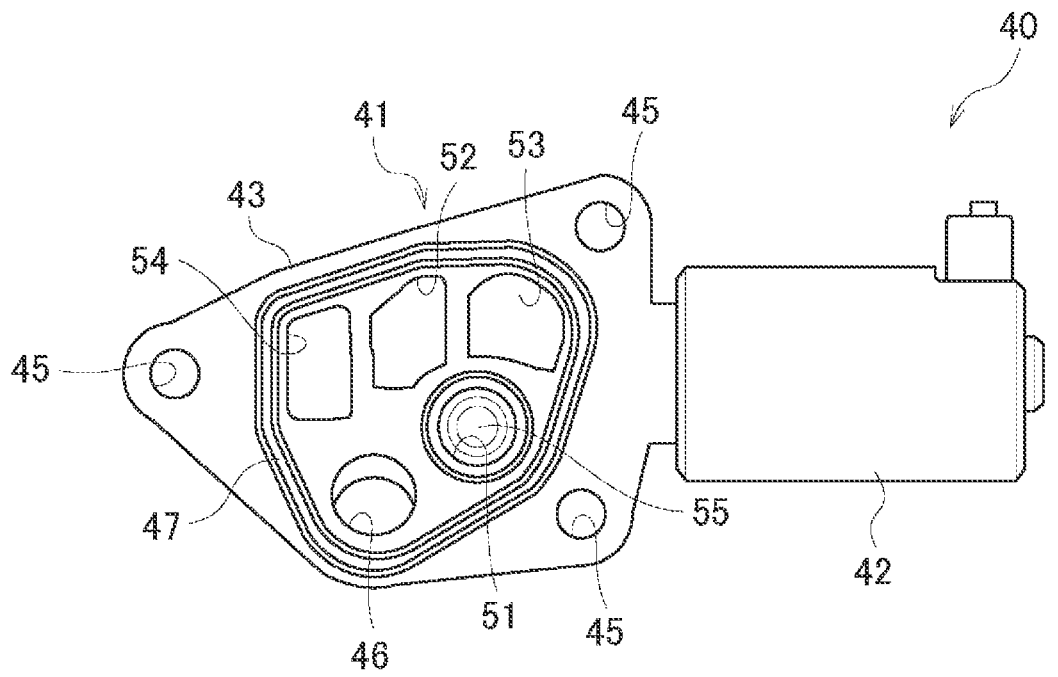

The oil control valve will be described with reference to FIG. 4A and FIG. 4B. FIG. 4A and FIG. 4B are front and rear views of the oil control valve according to the present embodiment. FIG. 4A shows the front view of the oil control valve, and FIG. 4B shows the rear view of the oil control valve.

As shown in FIG. 4A and FIG. 4B, the valve housing 41 of the oil control valve 40 includes a disposing plate 43 disposed on the side surface of the cylinder 25, and a cylindrical case 44 bulging outward from the disposing plate 43. Three fixing holes 45 for screwing are formed in an outer edge of the disposing plate 43 so as to surround the cylindrical case 44. A supply port 46 to which the external pipe 39 (see FIG. 2) is connected is formed in a lower portion of the disposing plate 43. The valve spool extending from the solenoid 42 is inserted into the cylindrical case 44. A destination of the oil entering from the supply port 46 is switched by the valve spool.

An O-ring 47 that seals a gap between a rear surface of the disposing plate 43 and the side surface of the cylinder 25 is attached to the rear surface of the disposing plate 43. The supply port 46, an input port 51, an advance port 52, a retard port 53, and a drain port 54 are formed inside the O-ring 47. The supply port 46 communicates with the input port 51 through the oil path formed in the cylinder 25. A filter 55 is disposed in the input port 51, and the oil is filtered by passing through the filter 55. The input port 51 communicates with any one of the advance port 52, the retard port 53, and the drain port 54 depending on a position of the valve spool.

When the oil enters the input port 51 from the supply port 46, the oil filtered by the filter 55 of the input port 51 is input to the cylindrical case 44. By moving the valve spool by the solenoid 42, the input port 51 is communicated with either the advance port 52 or the retard port 53, and the drain port 54 is communicated with the other of the advance port 52 and the retard port 53. Accordingly, the oil is supplied from the oil control valve 40 toward either an advance chamber S1 or a retard chamber S2 of the variable valve device 60 (see FIG. 10) which will be described later, and the excess oil is discharged toward the oil control valve 40 from the other of the advance chamber S1 and the retard chamber S2.

Figure 5:
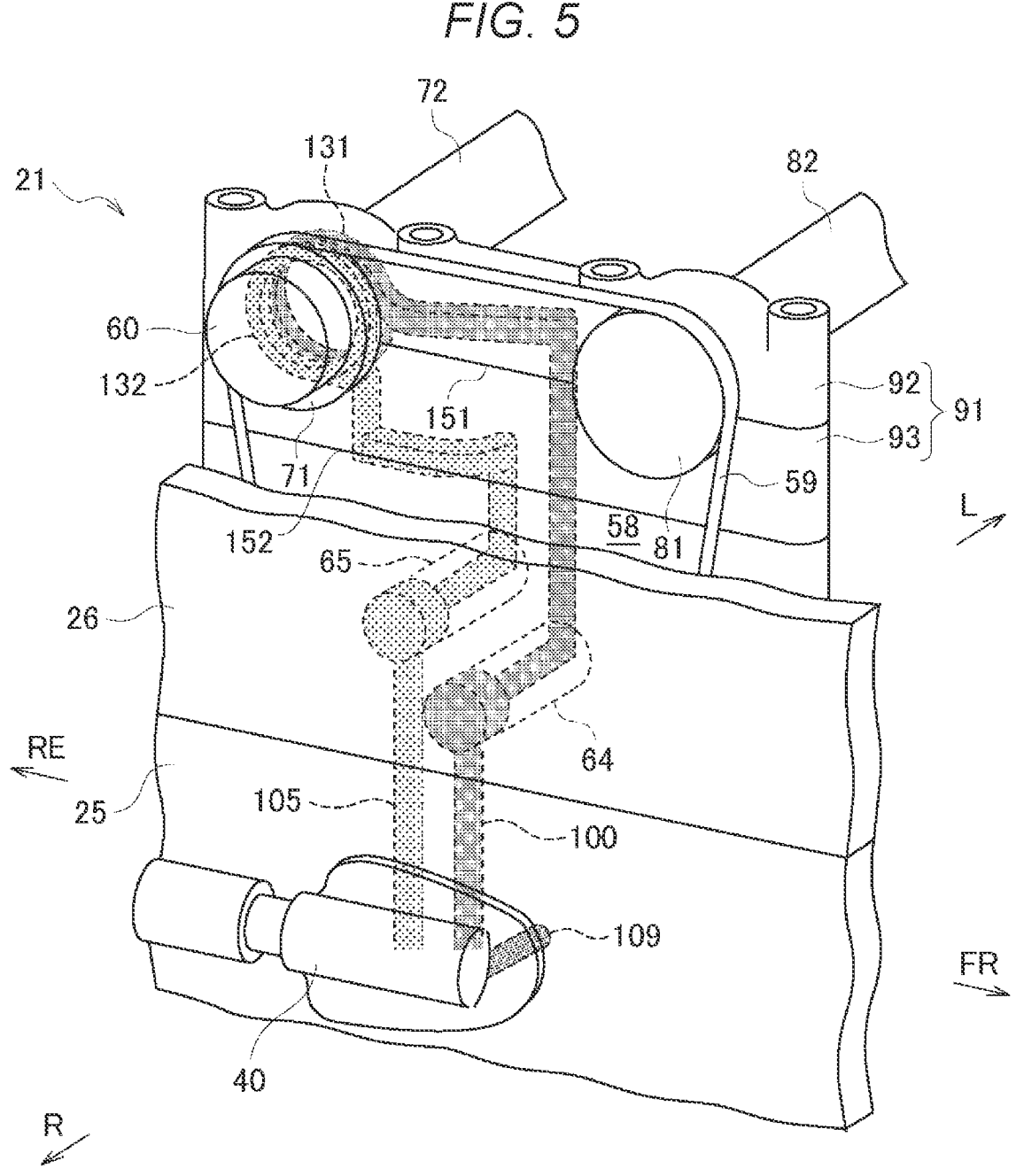
FIG. 5 is a schematic view of an oil path according to the present embodiment.
Figure 6:
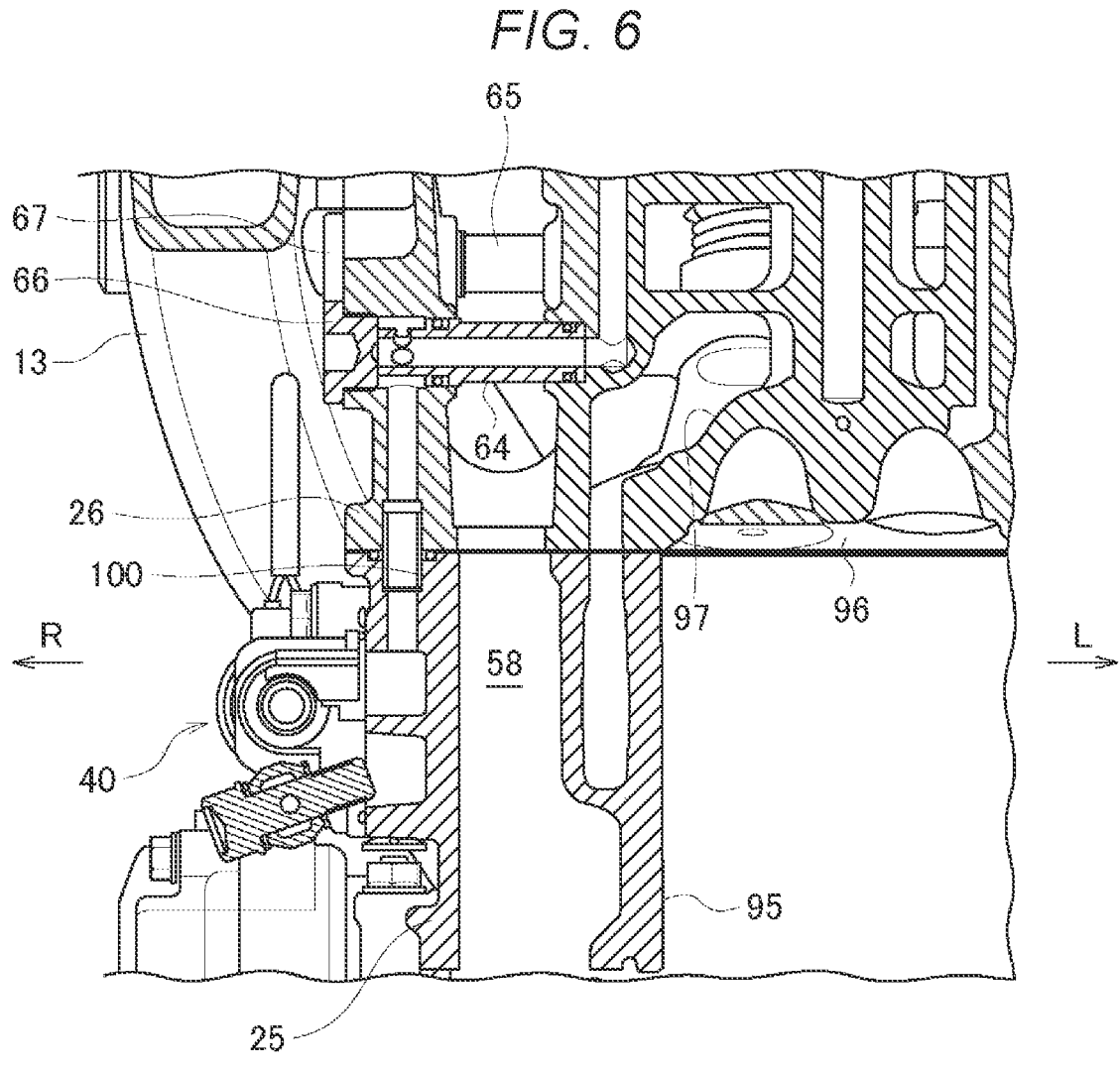
FIG. 6 is a cross-sectional view of the engine in FIG. 2 taken along a line A-A.
Figure 7:
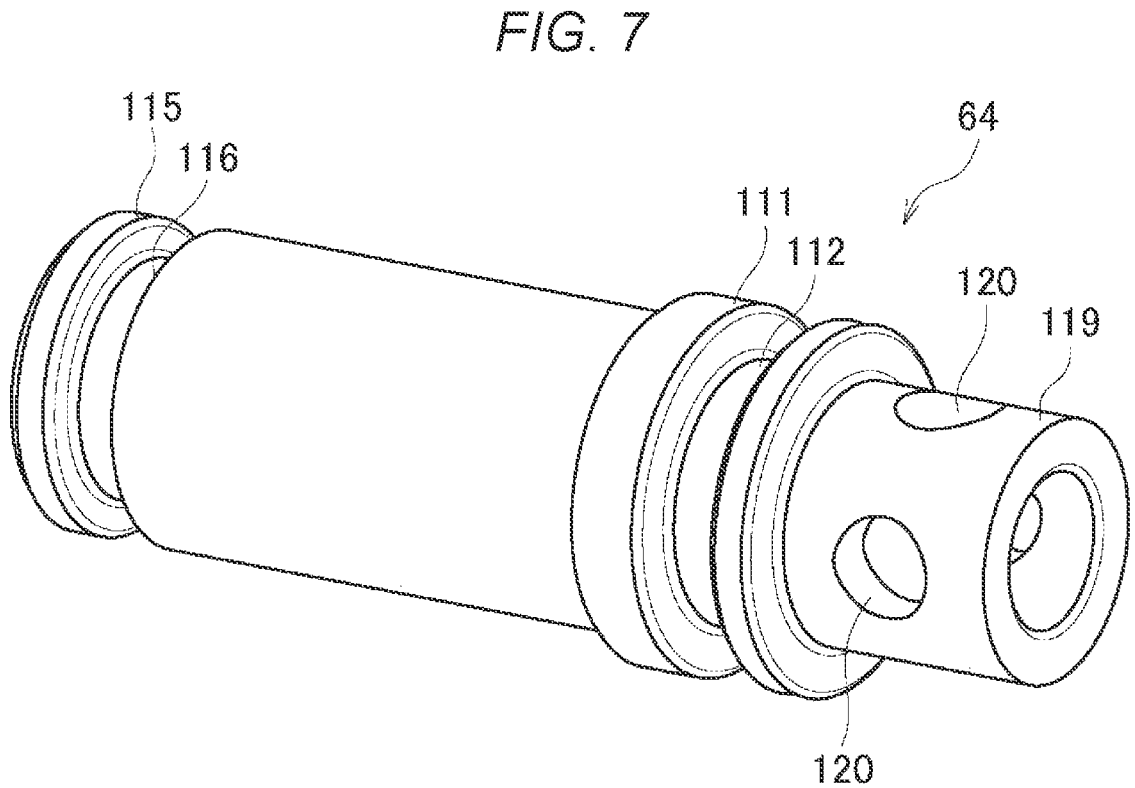
FIG. 7 is a perspective view of an oil pipe according to the present embodiment.
Figures 8A, 8B:
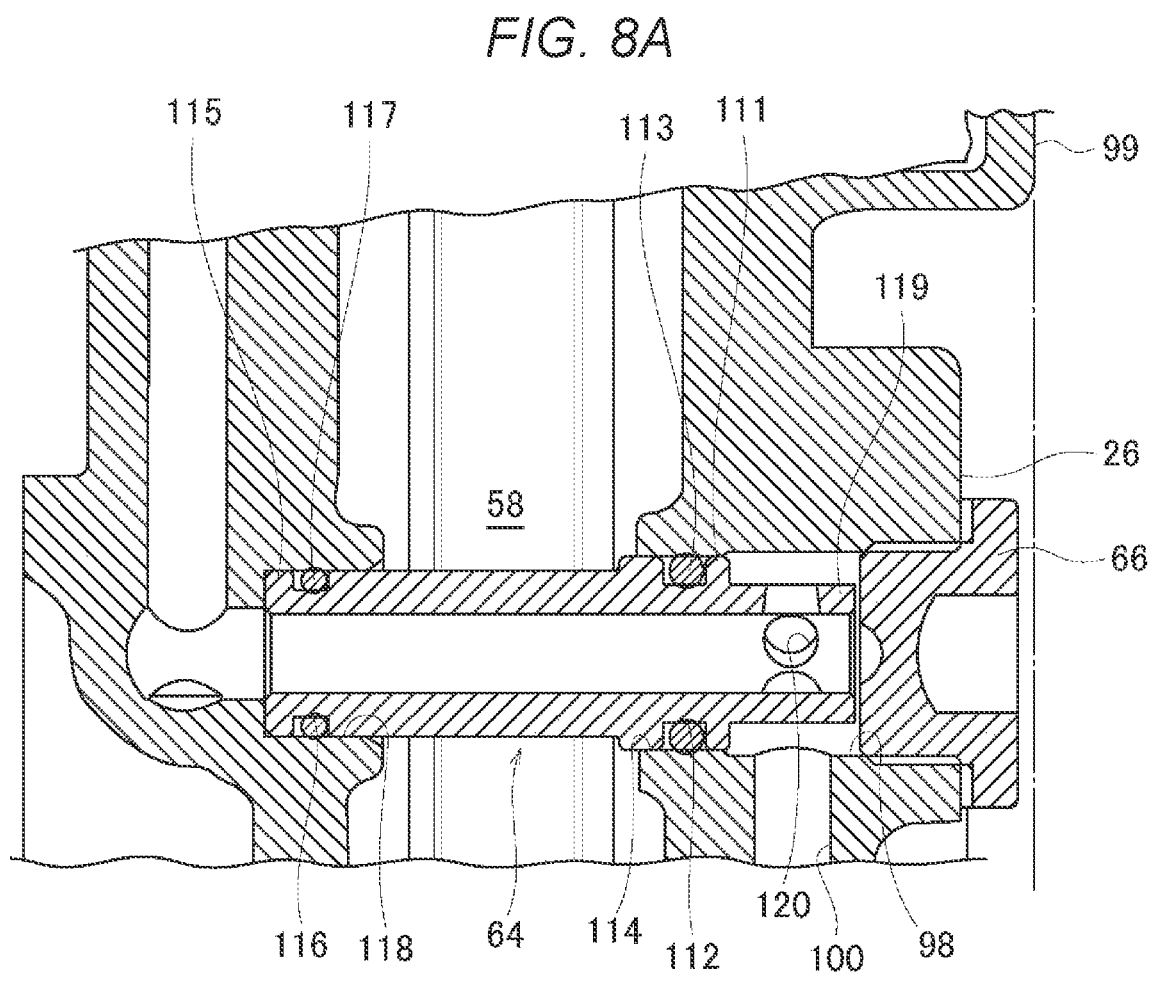
FIG. 8A and FIG. 8B are cross-sectional views of a disposing location of the oil pipe according to the present embodiment.
Figures 9A, 9B:
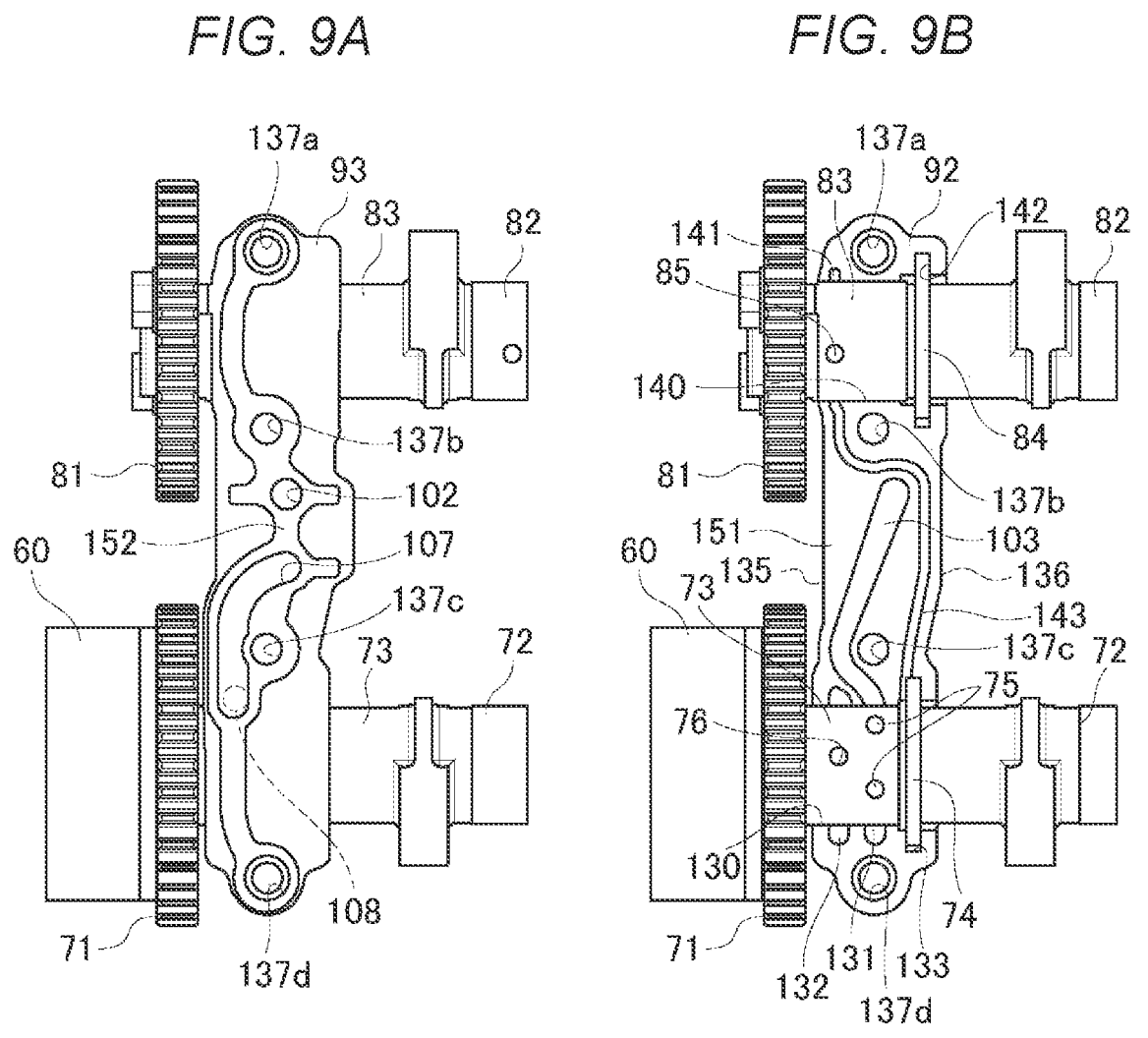
Figure 9C:
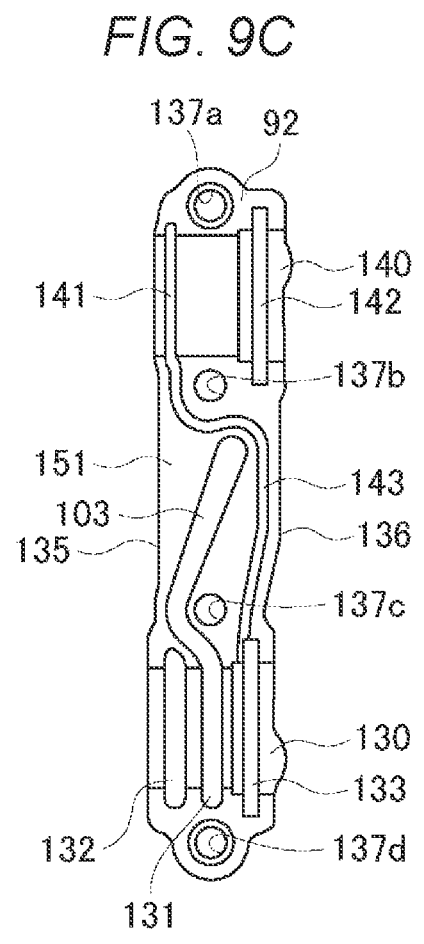

The oil path in the engine will be described with reference to FIG. 5 to FIGS. 9A, 9B, and 9C. FIG. 5 is a schematic view of the oil path according to the present embodiment. FIG. is a cross-sectional view of the engine in FIG. 2 taken along a line A-A. FIG. 7 is a perspective view of the oil pipe according to the present embodiment. FIG. 8A and FIG. 8B are cross-sectional views of a disposing location of the oil pipe according to the present embodiment. FIG. 9A, FIG. 9B, and FIG. 9C are explanatory diagrams of the oil path in the cam housing according to the present embodiment. In FIG. 6, a cam chain is omitted for convenience of description. FIG. 8A shows a state with the plug cap attached, and FIG. 8B shows a state with the plug cap removed. FIG. 9A shows a lower housing viewed from below, FIG. 9B shows an upper housing viewed from below, and FIG. 9C shows a state with a camshaft removed.

As shown in FIG. 5, the cam chain chamber 58 is formed in the cylinder 25 and cylinder head 26 of the engine 21. A cam chain 59 is accommodated in the cam chain chamber 58, and the cam chain 59 is stretched over an intake side cam sprocket 71 and an exhaust side cam sprocket 81. An intake side camshaft 72 is fixed to the intake side cam sprocket 71, and an exhaust side camshaft 82 is fixed to the exhaust side cam sprocket 81. The crankshaft (not shown) is connected to the intake side camshaft 72 and the exhaust side camshaft 82 via the cam chain 59.

The intake side camshaft 72 and the exhaust side camshaft 82 are rotatably supported by a cam housing 91. The cam housing 91 is a support wall fixed on the cylinder head 26, and includes an upper housing 92 that supports upper half portions of the camshafts 72 and 82 and a lower housing 93 that supports lower half portions of the camshafts 72 and 82. The variable valve device 60 is attached to one end portion of the intake side camshaft 72 inside the cylinder head 26. The variable valve device 60 advances or retards the intake side camshaft 72 according to the hydraulic pressure to change the opening and closing timing of the intake valve (not shown).

The oil control valve 40 is disposed on the outer surface (side surface) of the cylinder which is the outer wall of the cam chain chamber 58. The oil control valve 40 controls the hydraulic pressure with respect to the variable valve device 60. An advance path 100 extends from the advance port 52 (see FIG. 4B) of the oil control valve 40 toward the variable valve device 60, and a retard path 105 extends from the retard port 53 (see FIG. 4B) of the oil control valve 40 toward the variable valve device 60. The oil for advancing the opening and closing timing of the intake valve passes through the advance path 100, and the oil for retarding the opening and closing timing of the intake valve passes through the retard path 105.

The advance path 100 and the retard path 105 for the hydraulic pressure control enter the outer wall of the cam chain chamber 58 from the oil control valve 40. The advance path and the retard path 105 are oriented from a cylinder 25 side to a cylinder head 26 side, then cross the cam chain chamber 58 toward the variable valve device 60 through an inner wall of the cam chain chamber 58. In this case, the outer wall of the cam chain chamber 58 is formed by an outer wall of the cylinder 25, an outer wall of the cylinder head 26, and an outer wall of the crankcase 22, and the inner wall of the cam chain chamber 58 is formed by an inner wall of the cylinder 25, an inner wall of the cylinder head 26, an inner wall of the crankcase 22, and the cam housing 91.

The outer wall and the inner wall of the cylinder head 26 are connected by the pair of oil pipes 64 and 65. The pair of oil pipes 64 and 65 cross the cam chain chamber 58 through the inside of the cam chain 59. Since the oil pipes 64 and 65 are detachably disposed, the pair of oil pipes 64 and 65 do not interfere when the cam chain 59 is assembled. Since the oil pipes 64 and 65 are detachable, the pair of oil pipes 64 and 65 can be inserted after the cam chain 59 is assembled to the engine 21. Accordingly, a dead space inside the cam chain 59 can be effectively utilized.

In the outer wall of the cam chain chamber 58, the advance path 100 and the retard path 105 extend from the outer wall of the cylinder 25 toward the outer wall of the cylinder head 26 in parallel with the cylinder axis. In this case, the advance path 100 is positioned on the front side and the retard path 105 is positioned on the rear side, and the retard path 105 extends to a position higher than the advance path 100. Between the outer wall and the inner wall of the cam chain chamber 58, the advance path 100 and the retard path 105 pass through the pair of oil pipes 64 and 65 and extend in a direction orthogonal to the cylinder axis. Accordingly, the pair of oil pipes 64 and 65 form crossing points of the advance path 100 and the retard path 105.

In the inner wall of the cam chain chamber 58, the advance path 100 and the retard path 105 extend from the outer wall of the cylinder head 26 toward the cam housing 91 in parallel with the cylinder axis. The advance path 100 passes through the lower housing 93 and extends to a mating surface 151 between the lower housing 93 and the upper housing 92, and then passes through the mating surface 151, and is connected to an advance groove 131 laterally. The retard path 105 passes through a mating surface 152 between the cylinder head 26 and the lower housing 93 and extends below a retard groove 132, and then passes through the lower housing 93, and is connected to the retard groove 132 from below. The advance groove 131 and the retard groove 132 are connected to the variable valve device 60 through the intake side camshaft 72.

The advance path 100 and the retard path 105 are formed in the cylinder 25 and the cylinder head 26 by a straight path parallel to the cylinder axis and an orthogonal path orthogonal to the straight path. Therefore, the pressure loss of the oil in the advance path 100 and the retard path 105 is reduced, and the advance path 100 and the retard path 105 can be easily machined with respect to the cylinder 25 and the cylinder head 26. In the cylinder 25 and the cylinder head 26, the advance path 100 and the retard path 105 are arranged in parallel. Therefore, the advance path 100 and the retard path 105 are brought closer in a front-rear direction, and an increase in the size of the engine 21 is suppressed.

A drain hole 109 (see, in particular, FIG. 10) communicating with the drain port 54 (see FIG. 4B) of the oil control valve 40 is formed on the cylinder 25 side of the outer wall of the cam chain chamber 58. An inner peripheral surface of the cam chain 59 is positioned below the drain hole 109, and the oil is discharged from the drain hole 109 toward the cam chain 59. The oil dropped from the drain hole 109 is supplied to the cam chain 59, and a meshing point between the cam chain 59 and the intake side cam sprocket 71 and a meshing point between the cam chain 59 and the exhaust side cam sprocket 81 are properly lubricated, and durability of the cam chain 59 is improved. No guide or complicated machining for directing the oil to the cam chain 59 is required.

As shown in FIG. 6, a cylindrical cylinder bore 95 is formed in the cylinder 25, and a piston (not shown) is slidably accommodated in the cylinder bore 95. A ceiling surface covering the cylinder bore 95 is formed in the cylinder head 26, and a combustion chamber 96 is formed between a top surface of the piston and the ceiling surface of the cylinder head 26. A water jacket 97 that cools the combustion chamber 96 is formed on the inner walls of the cylinder 25 and the cylinder head 26. As described above, the cam chain chamber 58 is formed between the outer and inner walls of the cylinder 25 and the cylinder head 26 on one side (right side) of the engine 21 in the vehicle width direction.

The advance path 100 is formed from the disposing location of the oil control valve on the outer wall of the cylinder 25 to the outer wall of the cylinder head 26. The outer wall and the inner wall of the cylinder head 26 are connected via the oil pipe 64, and the advance path 100 crosses the cam chain chamber 58 through the oil pipe 64 above the combustion chamber 96. In this case, the advance path 100 crosses the cam chain chamber 58 toward an upper portion of the water jacket 97, and the advance path 100 is formed so as to pass next to the water jacket 97 on the inner wall of the cylinder head 26. The retard path 105 is also formed in substantially the same manner as the advance path 100.

The advance path 100 and the retard path 105 are formed so as to bypass the combustion chamber 96. Since the advance path 100 and the retard path 105 pass next to the water jacket 97, the oil in the advance path 100 and the retard path 105 is cooled by the water jacket 97. The cam chain chamber 58 and the water jacket 97 are formed between the advance path 100 and the combustion chamber 96 and between the retard path 105 and the combustion chamber 96, and the heat is less likely to be transferred from the combustion chamber 96 to the oil in the advance path 100 and the retard path 105. Therefore, a temperature of the oil in the advance path 100 and the retard path 105 is stabilized, and an operation of the variable valve device 60 is stabilized.

As shown in FIG. 7 and FIG. 8A, a first seal surface 111 disposed on the outer wall of the cam chain chamber 58 (cylinder head 26) is formed on one end side of an outer peripheral surface of the oil pipe 64, and a second seal surface 115 disposed on the inner wall of the cam chain chamber 58 is formed on the other end side of the outer peripheral surface of the oil pipe 64. The first seal surface 111 is slightly larger in diameter than the second seal surface 115, and a space between the first and second seal surfaces 111 and 115 is formed to have the same diameter as the second seal surface 115. One end portion of the oil pipe 64 which is the one end side of the first seal surface 111 is a diameter-reduced portion 119 having a diameter smaller than those of the first and second seal surfaces 111 and 115.

A first seal groove 112 is formed in the first seal surface 111, and a first O-ring 113 is mounted in the first seal groove 112. A second seal groove 116 is formed in the second seal surface 115, and a second O-ring 117 is mounted in the second seal groove 116. Through holes penetrate through the diameter-reduced portion 119 of the oil pipe 64 so as to intersect in a cross shape, and the oil pipe 64 and the advance path 100 are communicated through the through holes 120. The oil flows to the one end side of the oil pipe 64 in a radial direction through the through holes 120, and flows out from the other end side of the oil pipe 64 in the axial direction.

First and second disposing holes 114 and 118 are formed in the outer wall and the inner wall of the cam chain chamber 58 (cylinder head 26). The first seal surface 111 of the oil pipe 64 is disposed in the first disposing hole 114 on an outer wall side, and the second seal surface 115 of the oil pipe 64 is disposed in the second disposing hole 118 on an inner wall side. The first seal surface 111 and an inner peripheral surface of the first disposing hole 114 are liquid-tightly sealed with the first O-ring 113, and the second seal surface 115 and an inner peripheral surface of the second disposing hole 118 are liquid-tightly sealed with the second O-ring 117. The first and second seal surfaces 111 and 115 suppress oil leakage from the oil pipe on the outer and inner walls of the cam chain chamber 58.

The outer wall of the cam chain chamber 58 is formed with an insertion opening 98 for the oil pipe 64, and the insertion opening 98 is closed by the plug cap 66. A female screw is threaded on the inner peripheral surface of the insertion opening 98, and a male screw of the plug cap 66 is fitted into the female screw of the insertion opening 98. The insertion opening has a larger diameter than those of the first and second disposing holes 114 and 118. The diameter-reduced portion 119 of the oil pipe 64 is positioned inside the female screw of the insertion opening 98, and the through holes 120 of the diameter-reduced portion 119 communicate with the oil path opening to the female screw. The oil can easily enter the oil pipe from the insertion opening 98 through the plurality of through holes 120, and the pressure loss at one end side of the oil pipe 64 can be reduced.

In this case, after the second disposing hole 118 of φ12 (hole diameter 12 mm) is formed in the inner wall of the cam chain chamber 58, a pilot hole of φ14 (hole diameter 14 mm) is formed so as to chamfer the second disposing hole 118. The pilot hole forms the first disposing hole 114 in the outer wall of the cam chain chamber 58. A female screw of M16 (screw diameter 16 mm) is threaded at an entrance side of the pilot hole to form the insertion opening 98. Accordingly, by forming the pilot hole for the female screw, the second disposing hole 118 is chamfered and the first disposing hole 114 is formed. An inner diameter of the oil pipe 64 and an inner diameter of the through hole 120 are each formed to be φ6 (hole diameter 6 mm).

The one end portion of the oil pipe 64 is closed with the plug cap 66. A slight gap is provided between the one end portion of the oil pipe 64 and the plug cap 66, but the one end portion of the oil pipe 64 and the plug cap 66 may be brought into contact with each other. Tensioning of the oil pipe 64 also serves as a countermeasure against noise on the wall surface of the cam chain chamber 58. The outer wall of the cylinder head 26 bulges outward in the vehicle width direction at a location where the variable valve device 60 (see FIG. 9A and FIG. 9B) is accommodated, and an amount of protrusion of the plug caps 66 and 67 in the vehicle width direction is equal to or less than an amount of bulging of a bulging portion 99 of the outer wall. Accordingly, the engine 21 is easily assembled to the vehicle body frame 10.

As shown in FIG. 8B, the one end portion of the oil pipe 64 is the diameter-reduced portion 119, and thus a sufficient interval is provided between the insertion opening 98 and the diameter-reduced portion 119, and removal of the oil pipe 64 is improved. For example, the plug cap 66 is removed from the insertion opening 98, the diameter-reduced portion 119 of the oil pipe 64 can be grasped and pulled out with a tool 121 such as a needle pliers, or the hook can be hooked into the through hole 120 of the diameter-reduced portion 119 to pull out the diameter-reduced portion 119. The oil pipe 64 and the plug cap 66 for advancement have been described, and the angle oil pipe 65 and plug cap 67 for retardation are similarly constructed.

As shown in FIG. 9A to FIG. 9C, journals 73 and 83 of the intake side camshaft 72 and the exhaust side camshaft 82 are supported by the upper housing (support wall) 92 and the lower housing (support wall) 93. The intake side cam sprocket 71 and the variable valve device are attached to one end portion of the intake side camshaft 72, and the exhaust side cam sprocket 81 is attached to one end portion of the exhaust side camshaft 82. Thrust stoppers 74 and 84 for positioning in the axial direction (thrust direction) are formed on outer peripheral surfaces of the respective journals 73 and 83 of the intake side camshaft 72 and the exhaust side camshaft 82, respectively.

The advance groove 131, the retard groove 132, and an accommodation groove 133 are formed in a bearing surface 130 at an intake side of the upper housing 92 and the lower housing 93 (bearing surface of the lower housing 93 is not shown). The oil for advancing the intake side camshaft 72 enters the advance groove 131, the oil for retarding the intake side camshaft 72 enters the retard groove 132, and the thrust stopper 74 of the intake side camshaft is accommodated in the accommodation groove 133. At the bearing surface 130 at the intake side, the retard groove 132 is positioned on one wall surface 135 side of the upper housing 92, the accommodation groove 133 is positioned on the other wall surface 136 side of the upper housing 92, and the advance groove 131 is positioned between the retard groove 132 and the accommodation groove 133. Each groove is similarly formed in the lower housing 93.

Four bolt holes 137a to 137d are formed in the upper housing 92 and the lower housing 93 so as to sandwich the intake side camshaft 72 and the exhaust side camshaft 82 therebetween. At a center of a lower surface of the lower housing 93, an advance through path extends through the lower housing 93 in the up-down direction, and a retard path groove (see FIG. 9A) extends from the center of the lower surface of the lower housing 93 to the intake side while passing next to the bolt hole 137c. Parts of the advance through path 102 and the retard path groove 107 are sandwiched by bolts tightened in the bolt holes 137b and 137c. The lower surface of the lower housing 93 is the mating surface 152 between the cylinder head and the lower housing 93, and the mating surface 152 increases a surface pressure in the vicinity of the advance through path 102 and the retard path groove 107 to suppress the oil leakage.

The advance through path 102 extends to the mating surface 151 between the lower housing 93 and the upper housing 92, and an advance path groove 103 (see FIG. 9B) extending from an upper end of the advance through path 102 toward the advance groove 131 is formed in the mating surface 151. The retard path groove 107 extends below the retard groove 132, and a retard through path 108 penetrates the lower housing 93 in the up-down direction so as to connect the retard path groove 107 and the retard groove 132. Accordingly, the advance path that laterally supplies the oil to the advance groove 131 is formed by the advance through path 102 and the advance path groove 103, and the retard path 105 that supplies the oil to the retard groove 132 from below is formed by the retard path groove 107 and the retard through path 108.

The journal 73 of the intake side camshaft 72 is formed with an advance hole 75 corresponding to the advance groove 131 and a retard hole 76 corresponding to the retard groove 132. The advance hole 75 communicates with the advance chamber S1 (see FIG. 10) of the variable valve device 60 through the path in the intake side camshaft 72. The retard hole communicates with the retard chamber S2 (see FIG. 10) of the variable valve device 60 through the path in the intake side camshaft 72. The intake side camshaft 72 is advanced by supplying the oil from the advance groove 131 to the advance chamber S1 of the variable valve device 60, and the intake side camshaft 72 is retarded by supplying the oil from the retard groove 132 to the retard chamber S2 of the variable valve device 60.

Here, power is transmitted from the cam chain 59 (see FIG. 10) to the intake side camshaft 72 via the variable valve device 60. The variable valve device 60 continues to receive torque from the intake side camshaft 72 in a direction of retarding an inner rotor 62 (see FIG. 10), and a larger hydraulic pressure is required to advance the intake side camshaft 72 than to retard the intake side camshaft 72. Since the advance groove 131 is disposed between the retard groove 132 and the accommodation groove 133 in the bearing surface 130, the advance groove is separated from one wall surface 135 and the other wall surface 136. A counter hydraulic pressure that delays the oil leakage of the advance groove 131 is generated in the retard groove and the accommodation groove 133, the oil leakage from the advance groove 131 is suppressed, and the variable valve device 60 can be stably operated with an appropriate hydraulic pressure.

Since the hydraulic pressure required for the retard groove 132 is smaller than that for the advance groove 131, even if some oil leaks from the retard groove 132, the operation of the variable valve device 60 is not affected. The accommodation groove 133 not only lubricates the thrust stopper 74 with the oil, but also generates the counter hydraulic pressure against the oil leakage of the advance groove 131. Since a main purpose of the accommodation groove is lubrication and the counter hydraulic pressure, even if some oil leaks from the accommodation groove 133, the operation of the variable valve device 60 is not affected. The upper housing 92 and the lower housing 93 are separate components from the cylinder head 26, and thus the mating surface 151 between the upper housing 92 and the lower housing 93 has high planar accuracy, and the advance groove 131, the retard groove 132, and the accommodation groove 133 are formed with high precision.

A lubrication groove 141 and an accommodation groove 142 are formed on a bearing surface 140 on an exhaust side of the upper housing 92 and the lower housing 93 (bearing surface of the lower housing 93 is not shown). The oil for lubrication enters the lubrication groove 141, and the thrust stopper 84 of the exhaust side camshaft 82 is accommodated in the accommodation groove 142. The lubrication groove 141 is positioned on the one wall surface side of the upper housing 92, and the accommodation groove 142 is positioned on the other wall surface 136 side of the upper housing 92. Each groove is similarly formed in the lower housing 93. The journal 83 of the exhaust side camshaft 82 is formed with an oil hole 85 through which the oil for lubrication is passed from the path in the exhaust side camshaft 82 to the lubrication groove 141.

The mating surface 151 between the lower housing 93 and the upper housing 92 is formed with a lubrication path groove 143 through which the oil for lubrication passes from the lubrication groove 141 of the exhaust side camshaft 82 toward the accommodation groove 133 of the intake side camshaft 72. Accordingly, the lubrication groove 141 and the lubrication path groove 143 form a lubrication path that laterally supplies the oil to the accommodation groove 133. At the mating surface 151 between the housings, the lubrication path groove 143 bypasses the advance path groove 103 so as to pass through the inside of the engine 21, passes next to the advance path groove 103, and is connected to the accommodation groove 133. The thrust stopper 74 of the intake side camshaft 72 is lubricated by supplying the oil from the lubrication path groove 143 to the accommodation groove 133.

Since the lubrication path groove 143 passes next to the advance path groove 103, the oil leakage of the advance path groove 103 is suppressed by generating, in the lubrication path groove 143, the counter hydraulic pressure against the oil leakage of the advance path groove 103. The advance path groove 103 is formed wider than the lubrication path groove 143 at the mating surface 151 between the housings, and the advance path groove 103 secures the amount of the oil required to advance the intake side camshaft 72. The oil path extending from the exhaust side camshaft 82 to the intake side camshaft 72 is formed by the lower housing 93 and the upper housing 92, and thus members such as pipes are not required, and space saving is achieved.

The variable valve timing system will be described with reference to FIG. 10. FIG. is a schematic view of the variable valve timing system according to the present embodiment.

Figure 10:
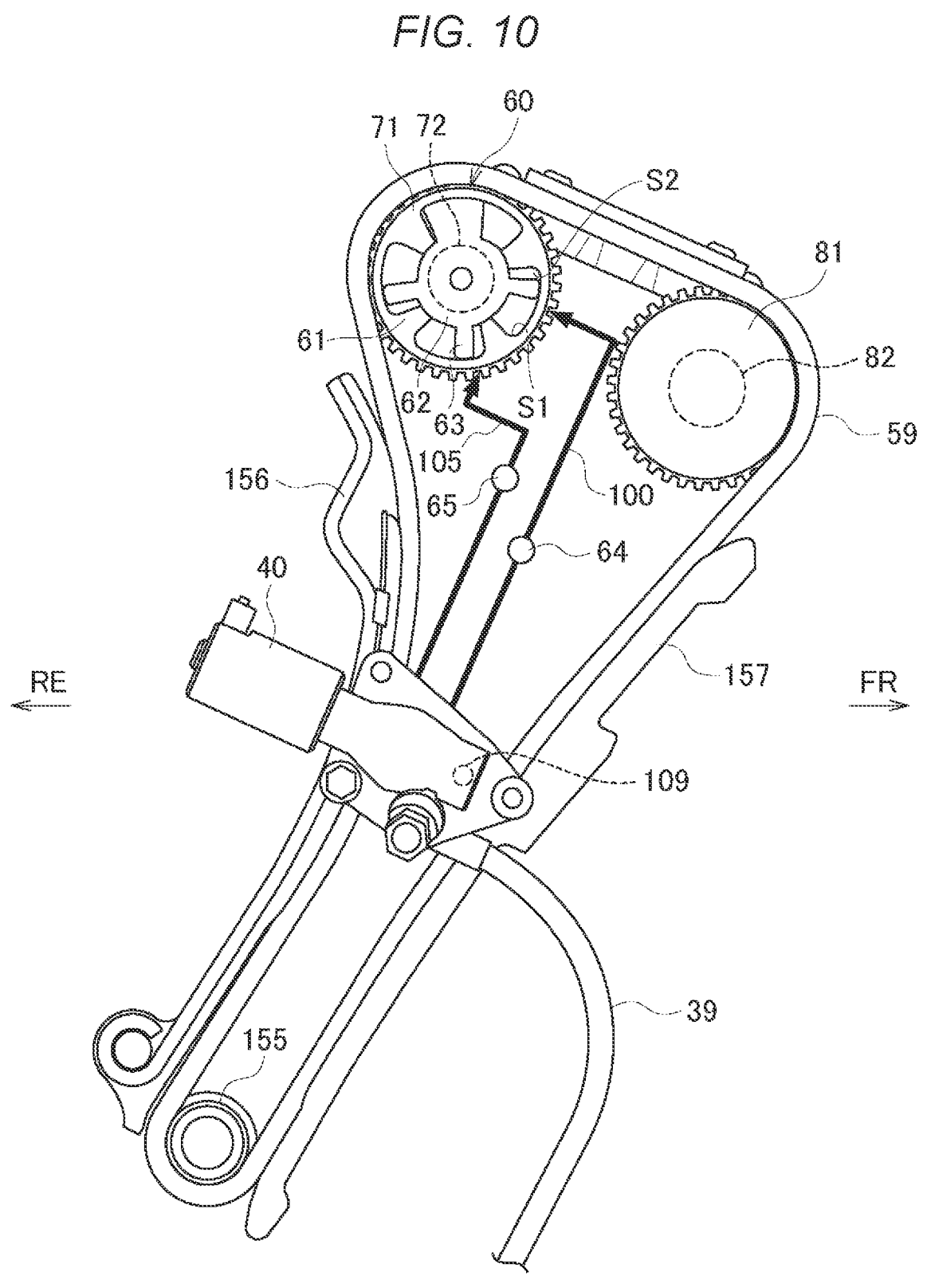

As shown in FIG. 10, a drive gear 155 for the cam chain 59 is provided below the oil control valve 40. A crankshaft (not shown) is connected to the drive gear 155 via a gear train. A lower portion of the cam chain 59 is wound around the drive gear 155, and an upper portion of the cam chain 59 is wound around the intake side cam sprocket 71 and the exhaust side cam sprocket 81. As the drive gear 155 rotates and the cam chain 59 rotates in a circle, the intake side camshaft 72 rotates integrally with the intake side cam sprocket 71, and the exhaust side camshaft 82 is rotated integrally with the exhaust side cam sprocket 81.

The cam chain 59 is guided by a lever guide 156 and a chain guide 157. The cam chain 59 sent from the drive gear 155 to the intake side cam sprocket 71 is guided by the lever guide 156, and the cam chain 59 drawn to the drive gear 155 from the exhaust side cam sprocket is guided by the chain guide 157. The cam chain 59 extending from the drive gear 155 to the intake side cam sprocket 71 becomes loose, and thus a chain tensioner (not shown) presses the lever guide 156 against the cam chain 59 to give tension to the cam chain 59.

The intake valve and an exhaust valve are opened and closed by the rotation of the intake side camshaft 72 and the exhaust side camshaft 82, but the opening and closing timing of the intake valve is changed by the variable valve timing system. The variable valve timing system is provided with the variable valve device 60 which changes a relative rotational phase of the intake side camshaft 72 with respect to the crankshaft. The variable valve device 60 includes a case 61 fixed to the intake side cam sprocket 71 and the inner rotor 62 fixed to the intake side camshaft 72. The inner rotor 62 is accommodated inside the case 61 in a relatively rotatable manner.

A plurality of hydraulic pressure chambers are formed in the case 61 of the variable valve device 60, and a plurality of vanes 63 extend radially outward from the inner rotor 62. The vane 63 of the inner rotor 62 is accommodated in each of the hydraulic pressure chambers of the case 61, and each of the hydraulic pressure chambers is partitioned by the vane 63 into the advance chamber S1 and the retard chamber S2. When a volume of the advance chamber is increased according to the hydraulic pressure, the inner rotor 62 is rotated to an advance side relative to the case 61, and the intake side camshaft 72 is advanced. When a volume of the retard chamber S2 is increased according to the hydraulic pressure, the inner rotor 62 is rotated to a retard side relative to the case 61, and the intake side camshaft 72 is retarded.

The variable valve device 60 is operated according to the hydraulic pressure from the oil control valve 40. The oil is supplied to the oil control valve 40 from the main gallery 38 (see FIG. 2) through the external pipe 39. According to a communication state between the ports of the oil control valve 40, an oil supply destination from the oil control valve 40 is switched between the advance chamber S1 and the retard chamber S2 of the variable valve device 60. The oil is supplied from the oil control valve 40 through the advance path 100 to the advance chamber S1, and the oil is supplied from the oil control valve 40 through the retard path 105 to the retard chamber S2.

As described above, the advance path 100 and the retard path 105 cross the cam chain chamber 58 (see FIG. 6), and the oil pipes 64 and 65 are used to cross the cam chain chamber 58. The oil pipes 64 and 65 are disposed inside the cam chain 59 between the lever guide 156 and the chain guide 157. The oil pipes 64 and 65 are arranged in the front-rear direction while being separated from each other in the up-down direction, and the disposing area of the oil pipes 64 and 65 is narrowed, and the oil pipes 64 and 65 are disposed inside the cam chain 59 with ample space. Even when the cam chain 59 is pushed by the lever guide 156, the cam chain 59 does not interfere with the oil pipes 64 and 65.

According to the present embodiment, the oil control valve 40 is separated from the vehicle body frame 10 on which the cylinder head 26 is suspended, and thus the degree of freedom in the shape of the vehicle body frame 10 is improved and the increase in the size of the vehicle is suppressed. The oil control valve 40 is detachably disposed on the outer surface of the cylinder 25, so that the mountability of the engine 21 on the vehicle body frame 10 and disposability of the oil control valve 40 are improved. That is, the oil control valve 40 can be disposed on the engine 21 after the engine 21 is mounted on the vehicle body frame 10. Since the oil control valve 40 is brought close to the center of gravity of the engine 21, the transmission of the vibration to the oil control valve 40 is reduced and the durability of the oil control valve 40 is improved.

In the present embodiment, the parallel 4-cylinder engine is exemplified as the engine, but the type of the engine is not particularly limited.

In the present embodiment, a twin spar frame is exemplified as the vehicle body frame, but the type of vehicle body frame is not particularly limited as long as the vehicle body frame can suspend the cylinder head. For example, the vehicle body frame may be a cradle frame.

In the present embodiment, the oil control valve is disposed on a right side surface of the engine, but the oil control valve may be disposed on a left side surface of the engine.

In the present embodiment, the oil control valve is disposed on the outer surface of the cylinder, but the oil control valve may be disposed on the outer surface of the engine. For example, the oil control valve may be disposed on an outer surface of the crankcase.

In the present embodiment, the solenoid valve is used as an example of the oil control valve, but the type of the oil control valve is not particularly limited as long as the oil control valve is a valve that can control the hydraulic pressure for the variable valve device.

In the present embodiment, the intake side camshaft is provided with the variable valve device, but at least one of the intake side camshaft and the exhaust side camshaft may be provided with the variable valve device.

In the present embodiment, the oil control valve and the main gallery are connected by the external pipe, but the oil control valve and the main gallery may be connected by the oil path inside the engine.

In the present embodiment, the detachable oil pipe forms a crossing path in the cam chain chamber, but the crossing path in the cam chain chamber may be formed so as to allow the oil to move between the inner wall and the outer wall of the cam chain chamber. For example, one of the inner wall and the outer wall of the cylinder head may protrude toward the other to form the crossing path.

In the present embodiment, the advance path and the retard path are partially formed in parallel, but the advance path and the retard path may be formed entirely non-parallel if the size of the engine is large enough.

In the present embodiment, the advance path and the retard path pass above the combustion chamber, but routes of the advance path and the retard path are not particularly limited. The advance path and the retard path may extend from the oil control valve across the cam chain chamber toward the variable valve device.

In the present embodiment, the oil control valve is disposed so as not to overlap with the bolt on the outer surface of the cylinder, but the oil control valve may overlap with the bolt if the oil control valve does not protrude excessively from the outer surface of the engine.

In the present embodiment, inside the cam chain, the pair of oil pipes are arranged in the front-rear direction while being separated from each other in the up-down direction, but the disposing location of the pair of oil pipes is not particularly limited as long as the pair of oil pipes do not interfere with the cam chain.

In the present embodiment, the pair of plug caps are disposed along the rear edge of the down frame, but the disposing location of the pair of plug caps is not particularly limited as long as the pair of plug caps do not interfere with the vehicle body frame.

In the present embodiment, the oil pipe and the plug cap are formed separately, but the oil pipe and the plug cap may be formed integrally.

In the present embodiment, the diameter of the one end portion of the oil pipe is reduced, and the through hole is formed in the one end portion in the radial direction, but the shape of the oil pipe is not particularly limited as long as the oil pipe can cross the cam chain chamber.

In the present embodiment, the support wall of the camshaft is the cam housing separate from the cylinder head, but the support wall of the camshaft may be formed integrally with the cylinder head.

In the present embodiment, the retard path of the cam housing connects to the retard groove from below, and the advance path of the cam housing connects to the advance groove laterally, but the routes of the advance path and the retard path of the cam housing are not particularly limited. For example, the retard path may connect to the retard groove laterally, and the advance path may connect to the advance groove from below.

In the present embodiment, the lubrication path groove is formed from the exhaust side camshaft toward the intake side camshaft, but the oil may be supplied from the intake side camshaft to the accommodation groove without forming the lubrication path groove.

In the present embodiment, the oil control valve is positioned outside the radiator in the vehicle width direction and below the down frame, but a position relationship between the radiator and the oil control valve is not particularly limited.

In the present embodiment, the oil control valve is positioned below the extension line extending from the lower end of the cooling fan in the blowing direction, but a position relationship between the cooling fan and the oil control valve is not particularly limited.

In the present embodiment, the oil control valve is positioned inside the engine cover and the down frames in the vehicle width direction, but the oil control valve may be positioned outside the engine cover and the down frames in the vehicle width direction.

In the present embodiment, the external pipe is positioned inside the engine cover and the down frames in the vehicle width direction, but the external pipe may be positioned outside the engine cover and the down frames in the vehicle width direction.

In the present embodiment, an area surrounded by the main frame, the down frame, and the lower surface of the cylinder head is formed in a triangle shape, but the shape of the area surrounded by the main frame, the down frame, and the lower surface of the cylinder head is not particularly limited.

The variable valve timing system may be applied not only to the shown straddle-type vehicle but also to other types of straddle-type vehicles. The straddle-type vehicle is not limited to general vehicles on which a rider rides in a posture of straddling a seat, and also includes a small-sized scooter-type vehicle on which a rider rides without straddling a seat.

As described above, the variable valve timing system according to the present embodiment is a variable valve timing system for an engine (21) in which a cylinder head (26) is fixed on a cylinder (25), and the cylinder head is suspended on a vehicle body frame (10), the variable valve timing system including: a variable valve device (60) configured to change an opening and closing timing of a valve according to a hydraulic pressure; and an oil control valve (40) configured to control the hydraulic pressure with respect to the variable valve device. The vehicle body frame includes a main frame (12) configured to laterally cover a rear side of the cylinder head and a down frame (13) configured to laterally cover a front side of the cylinder head. In a side view of a vehicle, the oil control valve is detachably disposed on an outer surface of the engine below an area surrounded by the main frame, the down frame, and a lower surface of the cylinder head. According to the configuration, the oil control valve is separated from the vehicle body frame on which the cylinder head is suspended, and thus the degree of freedom in a shape of the vehicle body frame is improved and an increase in a size of the vehicle is suppressed. The oil control valve is detachably disposed on the outer surface of the engine at a position where the vehicle body frame is avoided, so that mountability of the engine on the vehicle body frame and disposability of the oil control valve are improved. Since the oil control valve is brought close to the center of gravity of the engine, transmission of vibration to the oil control valve is reduced and durability of the oil control valve is improved.

In the variable valve timing system according to the present embodiment, a heat exchanger (radiator 16) is disposed in front of the engine, and in a front view of the vehicle, the oil control valve is positioned outside the heat exchanger in a vehicle width direction and below the down frame. According to the configuration, it becomes difficult for the heat exchanger and the down frame to block running wind to the oil control valve. Therefore, the oil control valve is cooled by the running wind, and deterioration of operability of the variable valve device due to temperature rise of oil and the oil control valve is suppressed.

In the variable valve timing system according to the present embodiment, a heat exchanger is disposed in front of the engine, and a cooling fan (19) is attached to a rear surface of the heat exchanger, and in the side view of the vehicle, a lower end of the down frame is positioned on an extension line extending from a lower end of the cooling fan in a blowing direction, and the oil control valve is positioned below the extension line. According to the configuration, exhaust air from the heat exchanger is less likely to hit the oil control valve, and the deterioration of the operability of the variable valve device due to the temperature rise of the oil and the oil control valve is suppressed.

In the variable valve timing system according to the present embodiment, an engine cover (clutch cover 31, starter gear covers 32 and 33) bulges outward in a vehicle width direction from an outer surface of the cylinder, and in a front view of the vehicle, the oil control valve is positioned inside the engine cover and the down frame in the vehicle width direction, and is positioned between the engine cover and the down frame. According to the configuration, the oil control valve is protected by the engine cover and the down frame when the vehicle overturns.

In the variable valve timing system according to the present embodiment, an engine cover bulges outward in a vehicle width direction from an outer surface of the cylinder, a main gallery (38) of oil is formed in the engine, and an external pipe (39) extends from the main gallery to the oil control valve, and in a front view of the vehicle, the external pipe passes through inner sides of the down frame and the engine cover in the vehicle width direction, and is connected to the oil control valve below the down frame. According to the configuration, the external pipe is protected by the engine cover and the down frame when the vehicle overturns.

In the variable valve timing system according to the present embodiment, a cam chain chamber (58) is formed in the cylinder and the cylinder head, an oil pipe (64 and 65) is detachably disposed across the cam chain chamber, an oil path for hydraulic pressure control enters an outer wall of the cam chain chamber from the oil control valve, and after extending toward a side of the cylinder head from a side of the cylinder, the oil path extends toward the variable valve device through an inner wall of the cam chain chamber through the oil pipe, and in the side view of the vehicle, the oil pipe is positioned in the area surrounded by the main frame, the down frame, and the lower surface of the cylinder head. According to the configuration, the oil pipe can be disposed by using a narrow area surrounded by the main frame, the down frame, and the lower surface of the cylinder head. A disposing location of the oil pipe is exposed to the side of the vehicle, and detachability of the oil pipe can be improved.

Although the present embodiment has been described, the embodiment described above and modifications may be combined entirely or partially as another embodiment.

The technique of the present invention is not limited to the embodiment described above, and various changes, substitutions, and modifications may be made without departing from the spirit of the technical concept. The present invention may be implemented by other methods as long as the technical concept can be implemented by the methods through advance of the technique or other derivative techniques. Therefore, the claims cover all embodiments that may be included within the scope of the technical concept.

What is claimed is:

1. A vehicle comprising:
a vehicle body frame and an engine in which a cylinder head is fixed on a cylinder, a lower surface of the cylinder head abuts the cylinder, and the cylinder head is suspended on the vehicle body frame;
a variable valve device configured to change an opening and closing timing of a valve according to a hydraulic pressure; and
an oil control valve configured to control the hydraulic pressure with respect to the variable valve device, wherein
the vehicle body frame includes a main frame configured to laterally cover a rear side of the cylinder head and a down frame configured to laterally cover a front side of the cylinder head,
in a side view of the vehicle, the oil control valve is detachably disposed on an outer surface of the engine below an area surrounded by the main frame, the down frame, and the lower surface of the cylinder head,
a front part of the cylinder head is suspended on a lower end of the down frame
a heat exchanger is disposed in front of the engine, and a cooling fan is attached to a rear surface of the heat exchanger, and
in the side view of the vehicle, the lower end of the down frame is positioned on an extension line extending from a lower end of the cooling fan in a blowing direction of the cooling fan, and the oil control valve is positioned below the extension line.

2. The vehicle according to claim 1, wherein
the heat exchanger is disposed in front of the engine, and
in a front view of the vehicle, the oil control valve is positioned outside the heat exchanger in a vehicle width direction and below the down frame.

3. The vehicle according to claim 1, wherein
an engine cover bulges outward in a vehicle width direction from an outer surface of the cylinder, and
in a front view of the vehicle, the oil control valve is positioned inside the engine cover and the down frame in the vehicle width direction, and is positioned between the engine cover and the down frame.

4. The vehicle according to claim 1, wherein
an engine cover bulges outward in a vehicle width direction from an outer surface of the cylinder,
a main gallery of oil is formed in the engine, and an external pipe extends from the main gallery to the oil control valve, and
in a front view of the vehicle, the external pipe passes through inner sides of the down frame and the engine cover in the vehicle width direction, and is connected to the oil control valve below the down frame.

5. The vehicle according to claim 1, wherein
a cam chain chamber is formed in the cylinder and the cylinder head,
an oil pipe is detachably disposed across the cam chain chamber, an oil path for hydraulic pressure control enters an outer wall of the cam chain chamber from the oil control valve, and after extending toward a side of the cylinder head from a side of the cylinder, the oil path extends toward the variable valve device through an inner wall of the cam chain chamber through the oil pipe, and in the side view of the vehicle, the oil pipe is positioned in the area surrounded by the main frame, the down frame, and the lower surface of the cylinder head.

6. The vehicle according to claim 5, wherein a plug cap configured to close an insertion opening for the oil pipe is disposed in the area surrounded by the main frame, the down frame, and the lower surface of the cylinder head.

7. The vehicle according to claim 1, wherein in the side view of the vehicle, the cylinder head and the cylinder are fixed by first and second bolts on both sides of a cylinder axis of the cylinder, and the cylinder and a crankcase are fixed by third and fourth bolts on both sides of the cylinder axis, and in the side view of the vehicle, the oil control valve is disposed so as not to overlap with the first bolt, the second bolt, the third bolt and fourth bolt.

\*   \*   \*   \*   \*